United States Patent [19]

Siwoff

[11] Patent Number: 4,783,162
[45] Date of Patent: Nov. 8, 1988

[54] SPECTACLE MOUNTED VARIABLE NEUTRAL DENSITY FILTER HOLDER

[76] Inventor: Ronald Siwoff, 901 Brown Rd., Bridgewater, N.J. 08807

[21] Appl. No.: 9,694

[22] Filed: Feb. 2, 1987

[51] Int. Cl.⁴ ............................ G02C 7/16; A61B 3/04
[52] U.S. Cl. ......................................... 351/49; 351/230
[58] Field of Search ...................... 351/46, 47, 49, 57, 351/163, 165, 230, 231, 233–235, 227–229, 232; 350/314

[56] References Cited

U.S. PATENT DOCUMENTS 2,064,812  12/1936  Bouchard .............................. 351/49
2,565,362   8/1951  Eloranta ............................... 351/49

Primary Examiner—Rodney B. Bovernick
Assistant Examiner—Jay Ryan

[57] ABSTRACT

A filter holder which clips on to an ophthalmic trial refraction frame or clip on to a person's spectacles with a clip on attachment is disclosed comprising a knob which rotates a shaft and a gear. The gear engages a ring with teeth in it. This ring is attached to a plate which has a channel cut through it, a pin to locate the position of the variable neutral density filter and a locking disc which holds the filter against the plate. On the back of the filter holder is a disc with an aperture mounted off the axis of symmetry of the filter holder so that the aperture is aligned with the channel in the edge of the plate. The patient sights through the aperture, the channel and the variable neutral density filter. By turning the knob, the neutral density filter rotates and the density in log units can be read on a scale on the front of the body of the filter holder.

5 Claims, 2 Drawing Sheets

SPECTACLE MOUNTED VARIABLE NEUTRAL DENSITY FILTER HOLDER

BACKGROUND OF THE INVENTION

1. Field of the Invention

This invention relates to a filter holder which may be spectacle mounted that rotates a round variable neutral density filter and thus reduces the contrast of various test objects viewed through the filter.

2. Description of Prior Art

In 1947 an ophthalmologist, named Amsler, described a grid pattern to evaluate central visual fields. Since that time various investigators have modified the grid so that the contrast of the background and grid can be varied to make the test much more sensitive to relative losses in field. Miller, Lamberts and Perry described an illuminated grid in Archives of Ophthalmology 1978; 96 901–902. Bernth-Petersen described a transilluminated Amsler grid in Acta Ophthalmology 1981, 59: 57–63. Finally, Wall and Sudun suggested using two rotating polaroid filters to attenuate the Amsler grid in Archives of Ophthalmology 1986 104: 520–523.

All of these devices are limited in their success because levels of density and contrast are variable and not properly calibrated and controlled. By using a variable neutral density filter the exact transmittance of the filter is known. It can be read directly from the scale on the device which reads transmittance as a function of the rotation of the control knob.

The object of the present invention is to provide a device which overcomes the deficiencies of prior art and enables the transmittance to be read directly without having to calibrate each device, each time it is used.

SUMMARY OF THE INVENTION

The present variable neutral density filter is a circular glass filter which is optically coated so that its optical density (D) is equal to a constant (M) times the rotation of the filter (R).

$$D = MR$$

The optical density is equal to the $\log_{10}$ of 1 divided by the transmittance (T).

$$D = \log_{10}(1/T)$$

Thus by rotating R degrees the transmittance changes reducing the contrast of the white grid on the black background.

The filter holder was designed to allow the patient to look through it, while the patient turns a small knob which changes the contrast of the white grid. When the grid disappears or appears the optical density is read off a scale so that the progressive loss of central visual disturbances can be monitored as well as the success of various types of therapy.

BRIEF DESCRIPTION OF THE DRAWINGS

An embodiment of the invention is shown in the accompanying drawings wherein.

DESCRIPTION OF THE PREFERRED EMBODIMENTS

Figure 1:
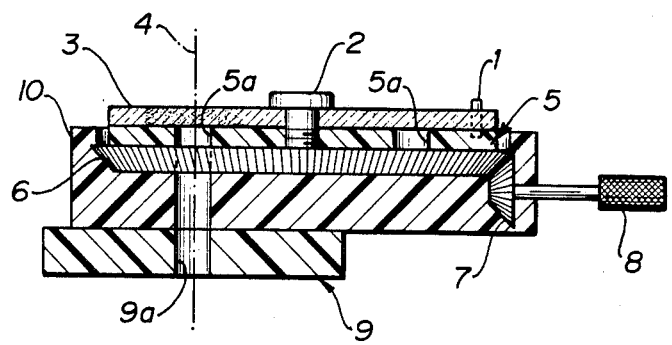
FIG. 1 is a side view, in cross-section, of the filter holder made in accordance with the invention. Number 1 is a locator pin that is permanently attached to the filter holder plate and inserts into the glass variable neutral density filter. Number 2 is a plastic locking screw that holds the variable neutral density filter to the holder plate, number 5. Number 3 is the variable neutral density filter. Number 4 is the line of sight through the aperture. Number 5 is a holding plate with a channel cut in it so that a person may view through the aperture, the groove in the holding plate and the variable neutral density filter. Number 6 is a ring gear that is attached to the holding disc. Number 7 is a gear that turns when knob number 8 is rotated. This gear rotates the ring gear, the holding plate and the neutral density filter. Number 8 is a knob attached to a rod and gear which rotates the neutral density filter. Number 9 is an aperture disc that has a hole drilled through it. The aperture disc can comprise a clip on to an ophthalmic trial refraction frame or a clip on attachment to attach the device to a person's glasses.
Figure 2:
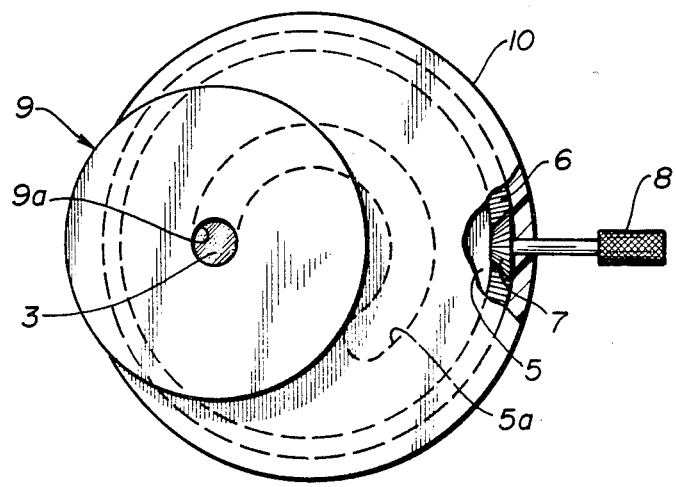
FIG. 2 is a rear view of the filter holder. Number 1 is the body of the filter holder. Number 2 is the channel in the holder plate. Number 3 is the aperture disc. Number 4 is the aperture. Number 5 is the rotating ring gear. Number 6 is the rotating gear. Number 7 is the knob that rotates the gear, the ring gear, the filter holder and the filter.
Figure 3:
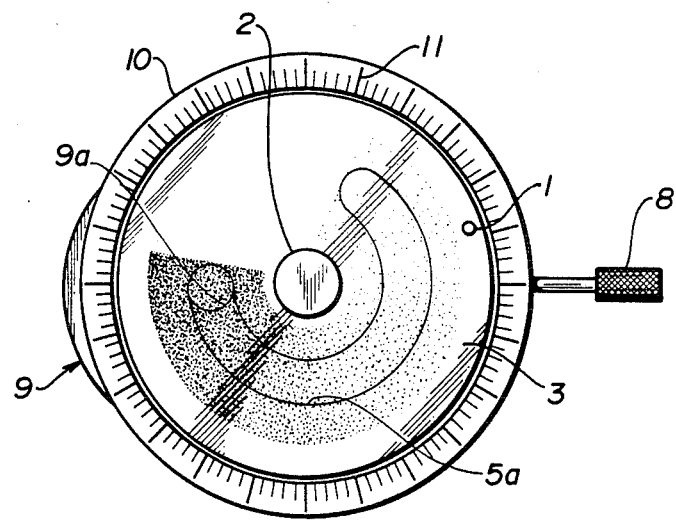
FIG. 3 is a front view of the filter holder. Number 1 is a locator pin which is attached to the holding disc and orients the variable neutral density filter. Number 2 is a plastic locking screw that holds the variable neutral density to the holding plate. Number 3 is a variable neutral density filter. Number 4 is a scale attached to the body of the filter holder so that density can be read directly off the scale. Number 5 is the aperture disc. Number 6 is the rotating knob that rotates the ring gear, the holding disc and the variable neutral density filter.

FIG. 1 #9, FIG. 2 #3, and FIG. 3 #5 are three views of an aperture disc. In the center of the disc is an aperture as seen in FIG. 1 #4 and FIG. 2 #4. This aperture is mounted off the axis of the body of the filter holder. A person sights through the aperture, FIGS. 1 and 2 #4, through a channel, FIG. 2 #2, and through the filter FIG. 1 #3 and FIG. 3 #3. This aperture disc clips on to the trial refraction frame or to a clip on attachment to a patient's spectacles.

A knob pictured in FIG. 1 #8, FIG. 2 #7 and FIG. 3 #6 rotates a gear in FIG. 1 #7 and FIG. 2 #6. This gear engages a ring gear in FIG. 1 #6 and in FIG. 2 #5.

The ring gear is permanently attached to a holding plate in FIG. 1 #6. This plate has a channel cut in it, FIG. 2 #2, a locator pin, FIG. 1 #1, and a threaded hole to receive the locking screw, FIG. 1 #2 and FIG. 3 #2. The channel allows a person to sight through the holding disc and through the variable neutral density filter, FIG. 1 #3, FIG. 3 #3. The locator pin FIG. 3 #1, fixes the orientation of the variable neutral density filter, FIG. 3 #3, to the scale on the body of the filter holder, FIG. 3 #4. The locking screw, FIG. 1 #2 and FIG. 3 #2, holds the variable neutral density filter against the holding disc.

In use, a person sights through the aperture and rotates the knob until the Amsler grid, a white grid pattern on a black background, is extinguished. The optical density is read directly off the scale.

What is claimed is:

1. A variable neutral density filter assembly comprising a graduated variable neutral density filter and a filter holder, said filter assembly further comprising attachment means for attachment to spectacles, said assembly further comprising an aperture disc mounted off the central axis of the body of said filter holder, a filter holder plate comprising a scale whereby the optical density may be read directly and further comprising locater means which orients said filter, locking means to hold said filter to said plate, a ring gear the holder plate such that a small attached to the holder plate such that a small rotation of a knob rotates a gear which rotates said ring gear, holding plate and neutral density filter.

2. The variable neutral density filter assembly of claim 1 wherein said aperture disc is opaque, and is mounted off the axis at symmetry of the filter holder such that the wearer's view is limited through the graduated portion of said filter and whereby the filters can be attached to a patient's spectacles or a separate spectacle, or an ophthalmic trial frame.

3. The filter holder of claim 1 wherein said scale comprises logarithmic measurement increments whereby the optical density may be read.

4. The variable neutral density filter assembly of claim 1 wherein said holding plate is opaque said locator means comprises a pin mounted in said holding plate to fix the orientation of the filter, said locking means comprises a central threaded hole to which a holding screw affixes the filter to the plate, and whereby said ring gear is affixed to the plate such that rotating the knob and gear rotates the plate and filter.

5. The variable neutral density filter of claim 4 wherein said filter's orientation is fixed by the pin mounted in said holding plated and held in position by said channel cut into said plate, whereby the optical density can be varied linearly by rotating the knob of the holder.

* * * * *